United States Patent Office 3,563,976
Patented Feb. 16, 1971

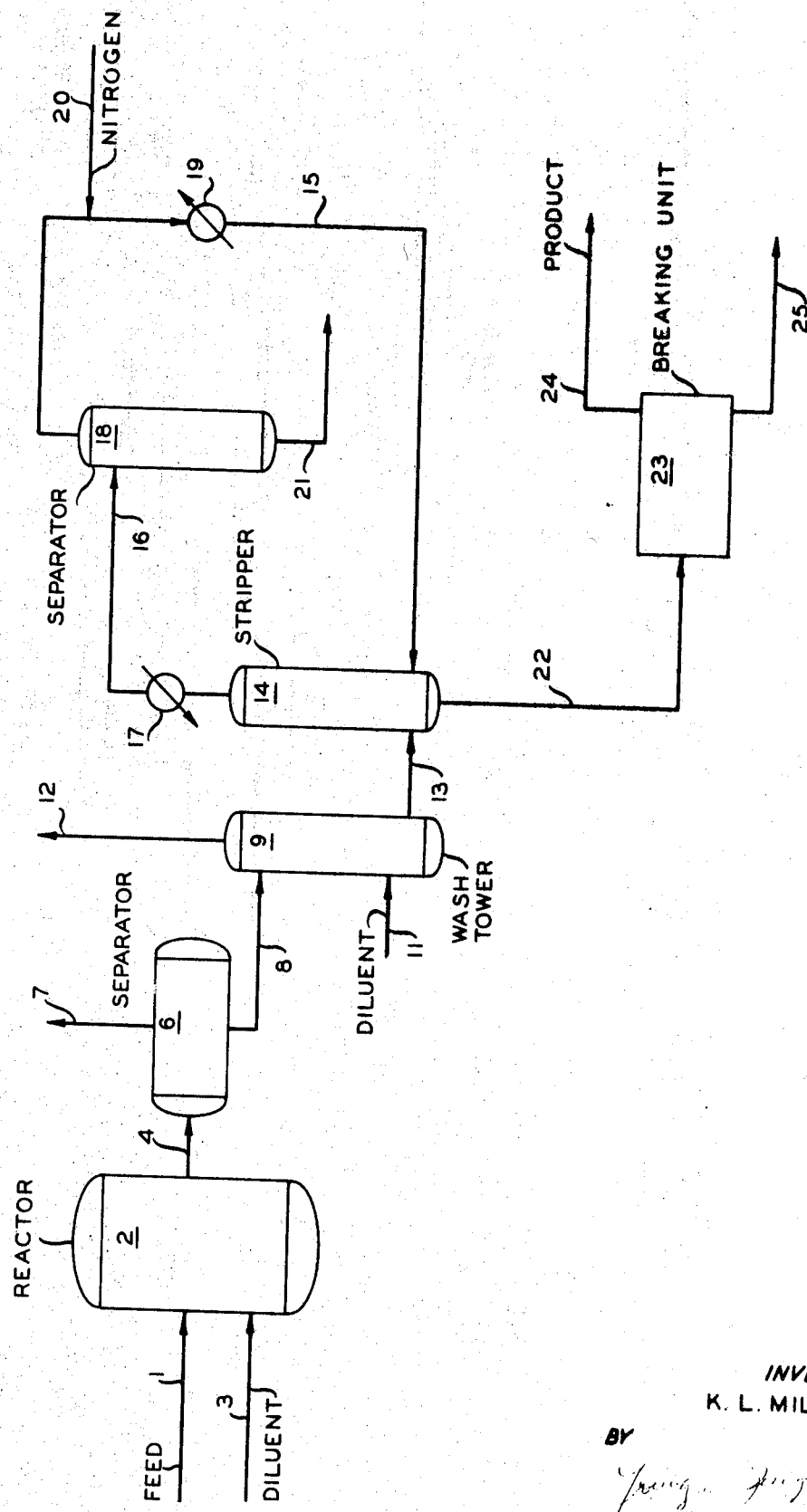

3,563,976
METHOD OF SEPARATING NON-ADDUCTED IMPURITIES FROM UREA AND THIOUREA ADDUCTS
King L. Mills, Jr., Bartlesville, Okla., assignor to Phillips Petroleum Company, a corporation of Delaware
Filed May 9, 1966, Ser. No. 548,469
Int. Cl. C07b *21/00*
U.S. Cl. 260—96.5                     7 Claims

ABSTRACT OF THE DISCLOSURE

Impurities are separated from urea and thiourea adducts by subjecting to an elevated temperature above 150° F. but below the adduct decomposition temperature with or without stripping with an inert gas.

---

This invention relates to the treatment of compounds which form adducts with urea or thiourea. In one aspect, it relates to the separation of straight chain organic compounds from branched-chain organic compounds by forming a urea adduct with the straight chain compounds, and removing branched-chain compounds from the adduct by volatilization. In another aspect, it relates to the separation of straight chain organic compounds from branched-chain organic compounds by forming a thiourea adduct with the branched-chain compound, and removing straight chain compounds from the adduct by volatilization. In another aspect, it relates to a method of purification of urea or thiourea adducts by volatilization of occluded impurities. In another aspect, it relates to the recovery of branched-chain compounds by distilling them from the straight chain compound-urea adducts. In another aspect, it relates to the recovery of straight chain compounds by distilling them from branched-chain-thiourea adducts. In still another aspect, it relates to the removal of volatile impurities from a urea or thiourea adduct by volatilizing the impurities at a temperature below the decomposition temperature of the adduct.

It has been known to the prior art that urea or thiourea will react with certain adduct-forming compounds to form adducts. Thus, for example, it is known that urea will react with straight carbon atom chain compounds having at least 6 carbon atoms per molecule to form a crystalline adduct. Further, it is known that the thiourea will react to form crystalline adducts with branched-chain compounds but will not form adducts with straight chain or aromatic compounds.

Generally, the adduct is separated from the reaction mixture by filtration or decantation, and repeated washings. This procedure, however, does not provide a high purity product because of the occlusion of a relatively large quantity of non-adducted compound within the adduct during its formation. Even repeated washings fail to remove this occluded impurity.

It is, therefore, an object of this invention to separate urea or thiourea adducts from non-adducted materials. It is an object of this invention to provide a method for the production of high purity straight chain organic compounds from urea adducts of them. It is an object of this invention to provide a method for the production of high purity branched-chain organic compounds from thiourea adducts of them. It is further an object of this invention to provide a method for the production of high purity straight chain hydrocarbons from a mixture containing them in combination with branched-chain hydrocarbons. It is further an object of this invention to provide a method for the production of high purity branched-chain hydrocarbons from a mixture containing them in combination with straight chain hydrocarbons. It is a further object of this invention to purify urea or thiourea adducts. It is yet a further object of this invention to provide a method for separating straight chain compounds from branched-chain compounds through an improved urea adduct formation and separation process. It is yet a further object of this invention to provide a method for separating branched-chain compounds from straight chain compounds through an improved thiourea adduct formation and separation process. It is still a further object of this invention to remove volatile materials from a urea or thiourea adduct.

Other aspects, objects and the several advantages of this invention are apparent to one skilled in the art from a study of this disclosure, and the appended claims.

In accordance with the invention, volatile impurities are separated from the urea or thiourea adducts by volatilizing them at a temperature below the decomposition temperature of said adduct. In general, this volatilization will be accomplished at sub-atmospheric pressures, and can be accompanied by a gas sweep to aid in removal of the volatile materials.

In general, the feed to the process of this invention can comprise a mixture of an adduct-forming compound and a non-adduct-forming compound, that is, a mixture of compounds which will form adducts with urea or thiourea and compounds which do not form adducts with urea or thiourea. As a general proposition, straight carbon atom chain organic compounds form adducts with urea while branched-chain or cyclic organic compounds do not form such adducts. On the other hand, branched-carbon atom chain organic compounds form adducts with thiourea, while straight carbon atom chain compounds or aromatic compounds not having a branched-chain alkyl substituent of more than 6 carbon atoms do not form such adducts. The straight chain compound which forms an adduct with urea can comprise one or more of a normal alkane or alkene hydrocarbon having from 6 to 50 carbon atoms per molecule, such as hexane, hexene, heptane, heptene, octane, octene, nonane, nonene, decane, decene, and progressively higher molecular weight alkanes and alkenes up to and including those containing as many as 50 carbon atoms per molecule. The straight chain organic compound which forms adducts with urea can also be a straight carbon atom chain primary alcohol having from 6 to 50 carbon atoms per molecule and being either saturated or unsaturated and thus corresponding in carbon atom structure to the aforementioned alkanes and alkenes. Examples of such alcohols include hexanol, hexenol, heptanol, heptenol, octanol, octenol, nonanol, nonenol, undecanol, undecenol, and higher paraffinic and olefinic alcohols. Urea also forms adducts with primary amines having as one substituent an alkyl group or an alkylene group containing at least 8 carbon atoms arranged in a straight carbon atom chain as well as with straight carbon atom ketones having from 6 to 50 carbon atoms such as hexanone, pentanone, octanone, decanone, dodecanone, and docosonone, and with alkyl bromides and alkylene bromides corresponding in carbon atom structure to the above mentioned straight chain hydrocarbons and alcohols. Further, it will form adducts with straight carbon atom chain esters of straight chain acids, such as the methyl, ethyl, propyl, butyl, pentyl, hexyl, heptyl, octyl, nonyl, and decyl esters of hexanoic, heptanoic, octanoic, undecanoic, dodecanoic and eicosanoic acids. Adducts can also be formed between urea and aliphatic mercaptans having from 6 to 50 carbon atoms arranged in a straight carbon atom chain. Among such compounds are hexyl mercaptans, heptyl mercaptans and octyl mercaptans and other mercaptans corresponding in molecular carbon atom structure to the above straight chain hydrocarbons.

Urea does not form adducts with organic compounds having less than 6 carbon atoms per molecule or with those having a branched carbon atom chain or an aromatic structure.

Thiourea will form adducts with an organic compound which has a branched carbon atom chain containing from 5 to 50 carbon atom chains in the straight chain portion of the molecule and from 1 to 20 carbon atoms in a side carbon atom chain. Thus, branched-chain hydrocarbons having the above number of carbon atoms per molecule and including branched-chain alkanes such as the methyl pentanes, the ethyl pentanes, the dimethyl and trimethyl pentanes, isohexane, the ethyl hexanes, the di-, tri- and tetrahexanes, the propyl hexanes, the methyl octanes, the ethyl and propyl octanes, isooctane, and other alkyl paraffins, such as the higher molecular weight alkyl paraffins, for example, methyl ethyl, propyl, butyl and hexyl hexadecanes, eicosanes, and pentacontanes, and including the branched-chain alkenes such as the ethyl hexenes, methyl pentenes, the ethyl pentenes, the dimethyl and trimethyl pentenes, the ethyl hexenes, the mono-, di-, tri- and tetramethyl and ethyl octenes, and other alkyl olefins including the high molecular weight alkyl olefins, such as the methyl ethyl, propyl, butyl and hexyl hexadecenes, docosenes form adducts with thiourea. Thiourea will also form adducts with branched carbon atom chain alcohols having from 5 to 50 carbon atoms in a straight carbon atom chain and from one to 20 carbon atoms in a side chain. The hydroxyl radical can be attached to the 1-position or to any other position. For example, there is included in this group of alcohols the methyl pentanols, the methyl hexanols, the ethyl and propyl hexanols, the methyl ethyl, propyl and butyl heptanols, the methyl, ethyl, propyl and butyl octanols, as well as such higher alcohols as dimethyl, trimethyl and tetramethyl docosanol. Also included are unsaturated alcohols having a like carbon atom configuration. Thiourea also forms adducts with branched carbon atom chain ketones having from 4 to 50 carbon atoms in the straight chain portion of the molecule and having a side chain containing from one to 20 carbon atoms, such as isobutyl ketone, the methyl hexanones, the methyl and ethyl heptanones, the methyl and ethyl octanones, and the methyl, ethyl, propyl and butyl nonanones; with the branched carbon atom chain amines and with secondary and tertiary amines having from 7 to 50 carbon atoms in the straight chain portion of the molecule and from 1 to 20 carbon atoms in a side chain, such as methylheptyl amines, dimethyl diethyloctyl amines, heptyl dimethyl amines, diheptyl amines and trioctyl amines. It also forms adducts with branched carbon atom chain mercaptans having from 6 to 50 carbon atoms in the straight chain portion of the molecule and having a side chain containing from one to 20 carbon atoms. Among such mercaptans are the methylhexyl, ethylhexyl, methylheptyl, ethylheptyl, propylheptyl, methyloctyl, methylnonal, and other mercaptans corresponding in molecular structure to the above branched chain hydrocarbons.

Thiourea does not form adducts with organic compounds having less than 5 carbon atoms per molecule or with those having a straight carbon atom structure or an aromatic carbon atom structure, said aromatic structure not containing a branched-chain alkyl substituent of 6 or more carbon atoms.

It is obvious from the foregoing discussion that urea and thiourea will form adducts with a large number of different compounds. Although there is set forth examples of numerous compounds which will form such adducts, numerous other compounds not specifically mentioned will similarly form adducts and a comprehensive and exhaustive enumeration of such compounds is highly impractical and would not aid in the understanding of this invention. Obviously, one skilled in the art, upon reading the present disclosure, can determine other adduct-forming compounds not specifically mentioned herein by means of mere routine test and without the exercise of inventive genius. After discovering such compounds, he will be able to practice the process of the present invention without having departed from the teachings that are contained herein.

According to one of the aspects of this invention, the feed material can comprise an adduct-forming compound admixed with a non-adduct-forming compound, each of which can be selected from one or more of the above illustrated compounds or others. Further, the non-adduct-forming compound can comprise non-alkylated aromatic compound or a non-adduct-forming aromatic compound irrespective of whether urea or thiourea is being employed as the adduct-forming reagent.

It is ordinarily preferable and often necessary to employ a suitable activator to insure that the rate of adduct formation between an adduct-forming compound and urea or thiourea will be within an operable range. Among such activators which can be employed to activate urea or thiourea are water; the low boiling aliphatic alcohols, such as methanol and ethanol; the low boiling ketones such as ethyl and propyl ketones; the low boiling organic esters such as methyl acetate and ethyl acetate; and nitrogen-containing compounds such as ammonia, aqueous solutions of ammonia, and ammonia derivatives including those having an alkyl, alkylene, hydroxyalkyl, acyl and aminoalkyl substituent wherein any aliphatic carbon atom chain in such substituent contains at least one but not more than 5 carbon atoms per radical. Representative of the group of compounds comprising such substituted ammonias are the mono-n-propyl, dimethyl, diethyl, monobutyl, and monopentyl amines, the monovinyl, divinyl, and monobutyl amines, and other amines including diethylenediamine, formamide, acetamide and dimethyl amino propane. Other nitrogen-containing compounds which can be employed include heterocyclic organic nitrogen base amines, such as pyrole, pyridine, piperidene, the picolines, pyramidine, pyroline, pyrazole, and pyrazine. The nitrogen-containing activators suitable for use in the process of this invention have been more fully described and claimed in an application, Ser. No. 155,134, filed Apr. 10, 1950, by Joseph I. Ackerman, Jr., Pat. No. 2,758,108 issued Aug. 7, 1956.

The adduct formation generally is accomplished in a solvent medium. Suitable solvents are the non-adducting portion of the medium being treated, or any solvent lower boiling than the medium being treated, for example, cyclohexane, pentane, etc., when urea is used, or normal pentane, hexane, etc., when thiourea is being used.

Following adduct formation by known methods, the solid adduct is separated from the diluent by decantation, filtration, centrifugation, or other convenient physical liquid-solid separation process. The solid adduct can be treated according to this invention without further treatment, or can be washed by reslurrying with a low-volatility, non-adducting solvent to decrease the amount of occluded, non-adductable material associated with the adduct and then placed in a stripping chamber where all occluded volatile impurities are removed by volatilization.

The conditions of such separation will vary widely depending upon the volatilization characteristics of the occluded volatile impurity and the decomposition temperature of the particular adduct formed. As mentioned above, great numbers of compounds may be separated by the process of this invention, and some degree of experimentation will be necessary to determine the operating parameters for any particular combination of adduct forming and non-adduct forming compounds in the particular feed stream used.

When working with hydrocarbon feed streams in the kerosene boiling range, for example, it has been determined that temperatures below 220° F. must be used to avoid adduct decomposition of urea adducts, and above 150° F. is necessary to remove the particular volatile impurities. A temperature in the range of 170° F. to 200° F. is preferred for urea adducts. When thiourea adducts are formed temperatures from 150° F. to 325° F. are suitable, and a range of 170° F. to 300° F. is generally preferred.

In order to reduce stripping time, a reduced pressure can be used. A pressure of 1 mm. to 100 mm. Hg is satisfactory, with a range of 5 mm. to 20 mm. being preferred with kerosene streams. Such vacuum stripping is generally conducted as a batch process, but can be continuous.

An alternate method of stripping the volatile materials is by gas sweep, which may be a continuous process. In this process, a slurry of the adduct in an inert liquid is contacted with a hot inert stripping gas sweep in a gas-liquid contact apparatus. The gas is conveniently nitrogen, although steam, combustion gas, normally gaseous hydrocarbons, carbon dioxide, or any inert volatile material can also be used. The entering gas is in the optimum temperature range for stripping as discussed above.

In the case of high boiling impurities being present, it is also possible to conduct a hot gas sweep at a reduced pressure. The sweep rate would be as high as possible without causing loss of vacuum in the system.

Following this vacuum stripping, the adduct can be broken by various methods known in the art to regenerate straight chain hydrocarbon and urea. The separation of these components by various methods is well known in the art. A suitable method for decomposition of the adduct is disclosed in Pat. No. 2,619,501, issued Nov. 25, 1952.

One embodiment of my invention is shown in the drawing. A feed stream comprising adductable and non-adductable compounds is introduced through line 1 to reactor 2, where it is contacted with urea or thiourea and an activator dissolved in a diluent introduced through line 3. The reaction slurry is conducted through line 4 to separator 6 wherein the solid adduct settles from the liquid. The raffinate and diluent is removed through line 7, and the adduct is taken through line 8 to wash tower 9, where it is washed with fresh diluent introduced through line 11. Washings are removed by line 12, and the washed adduct in slurry form is taken by line 13 to stripper 14. In the embodiment depicted, stripper 14 is a gas sweep contactor, wherein the adduct is contacted with hot nitrogen introduced through lines 20 and 15. The volatilized non-adducted compounds are carried overhead by the nitrogen through line 16 and passed through condensor 17, where the volatile materials are reliquefied. These liquids are separated in separator 18 from the nitrogen, which is reheated in heat exchanger 19 and recycled to the stripper 14 through line 15. Liquids in separator 18 are removed by line 21.

The stripped adduct from stripper 14 is taken by line 22 to adduct breaking unit 23. This unit can comprise any means of breaking urea or thiourea adducts known to the art, and is not a part of this invention. The hydrocarbon released from the adduct is taken through line 24 as a product of the process. Urea or thiourea is recovered by line 25 and can be recycled for further adduct formation.

EXAMPLE I

The straight chain hydrocarbons were separated from a kerosene fraction according to the process of my invention. The kerosene used had a boiling range of 300° F. to 550° F. Gas chromatographic analysis indicated the following distribution of hydrocarbon chain lengths:

| Carbon Number | Wt. percent |
| --- | --- |
| $C_9$ | 0.4 |
| $C_{10}$ | 15.9 |
| $C_{11}$ | 18.2 |
| $C_{12}$ | 19.4 |
| $C_{13}$ | 27.1 |
| $C_{14}$ | 14.0 |
| $C_{15}$ | 4.1 |
| $C_{16}$ | 0.8 |
| $C_{17}$ | 0.1 |

150 pounds of this kerosene, 120 pounds of urea, and 4½ pounds of methanol activator were slurried in 100 pounds of n-hexane. After the adduct had formed, it was filtered, reslurried with an additional 150 pounds of n-hexane, refiltered and centrifuged.

A portion of the adduct thus formed was vacuum stripped for one hour at 180° F. and 8 mm. Hg pressure. 73.3 percent of the adduct placed in the stripper was recovered as bottom product. The adduct thus recovered was broken by heating at a temperature of 235° F. Separation of the broken product yielded 63.4 parts of urea, 10.0 parts of normal hydrocarbons, and 0.3 part of branched-chain hydrocarbons. The product obtained thus was 97 percent pure normal paraffin. Analysis of the overhead product from the stripper indicated a loss of normal hydrocarbons of 1.33 parts, which represents 11.8 percent of the total normal paraffins placed in the stripper. Inasmuch as this overhead product would be recycled in a continuous process, none of the normal paraffins would actually be lost from the system.

EXAMPLE II

The purified product from the previous example, 97 percent pure normal paraffins, was mixed with an equal weight of heavy alkylate obtained by the HF alkylation of $C_3$, $C_4$, and $C_5$ olefins with isobutane. Properties of the alkylate stream were:

A.P.I. Gravity at 60° F. _____ 58.1

Boiling Range:
    Initial boiling point, ° F. _____ 293
    5% distilled _____ 308
    50% distilled _____ 334
    90% distilled _____ 394
    95% distilled _____ 427

The mixture of normal paraffin with heavy alkylate was adduct was vacuum stripped at 250° F. and 60 mm. Hg methyl alcohol, 200 pounds of n-hexane diluent, and 150 pounds of thiourea. The adduct was washed several times with hexane, and 250 pounds of adduct was recovered. A portion of the adduct was broken, and the product recovered contained 83 percent isoparaffin and 17 percent n-paraffin on a diluent-free basis. Another portion of the adduct was vacuum stripped at 250° F. and 60 mm. Hg for 30 minutes. 78.5 percent of the adduct was recovered from the vacuum. This adduct was broken with water, and the product obtained was found by analysis to be 60 parts thiourea, 18 parts isoparaffin, 0.4 part normal paraffins and 0.1 part alcohol. The purity of the hydrocarbon product thus obtained was therefore 97.8 percent isoparaffin.

EXAMPLE III

A mixture of $C_{12}$ to $C_{15}$ normal internal olefins was charged to a hydroformylation unit, and the product hydrogenated to produce alcohols. The product stream had the following analysis:

| | Percent |
| --- | --- |
| Normal paraffins | 4 |
| Normal internal olefins | 56 |
| Branched-chain alcohols | 27 |
| Normal alcohols | 3 |
| Heavies (ethers, aldols, etc.) | 10 |

This product was adducted with thiourea by containing 100 parts of the mixture with 180 parts of thiourea, 4.8 parts of methyl alcohol, and 100 parts of normal hexane. 285 parts of thiourea adduct was recovered, having the following analysis:

| | |
|---|---:|
| Thiourea | 63.2 |
| Methyl alcohol | 1.7 |
| Heavies | 3.5 |
| Branched-chain alcohol | 9.5 |
| Normal hexane | 13.5 |
| Normal olefins | 7.6 |
| Normal paraffins | 0.6 |
| Normal alcohols | 0.4 |
| Total | 100.0 |

Breaking a portion of the above adduct with water and separating the organic phase yields a product of 3.5 parts heavies, 9.5 parts branched alcohols, and 8.6 parts straight chain compounds.

100 parts of the above adduct was heated in a vacuum of 40 mm. pressure and a temperature of 275° F. for a period of 30 minutes while being purged with nitrogen. The adduct was then water broken and separated, yielding a product having 9.0 parts of branched-chain alcohols, 3.5 parts of heavies, and 1.0 part of straight chain compound.

It is seen that the process of my invention reduces the straight chain compounds in the recovered product from 39.8 percent to 7.4 percent.

I claim:

1. A process for separating occluded volatile non-adducted branched-chain and cyclic hydrocarbon impurities from solid adducts of urea which comprises contacting a slurry of a solid adduct of urea and straight chain normal alkane and alkene hydrocarbons having 6 to 50 carbon atoms per molecule containing said impurities in an inert liquid of low volatility with a hot inert stripping gas at an elevated temperature above 150° F., but below the decomposition temperature of urea adducts, under subatmospheric pressure in a stripping zone for a period of time sufficient to volatilize and substantially remove said occluded volatile non-adducted branched-chain and cyclic hydrocarbon impurities from said solid adduct, and leaving a solid adduct of urea complexed with said normal alkane and alkene hydrocarbons.

2. A process according to claim 1 wherein said temperature is in the range of 150° to 220° F. and said pressure is in the range of 1 mm. to 100 mm. Hg.

3. A process according to claim 1 wherein said hot inert stripping gas is selected from the group consisting of steam, combustion gas, normally gaseous hydrocarbons, carbon dioxide, and nitrogen.

4. A process according to claim 1 wherein the complexed hydrocarbons are straight chain hydrocarbons complexed from a hydrocarbon mixture of the kerosene boiling range, said temperature is in the range of 170° to 200° F., and the inert gas is nitrogen.

5. A process for separating occluded volatile non-adducted straight chain and cyclic hydrocarbon impurities from solid adducts of thiourea which comprises contacting a slurry of a solid adduct of thiourea and branched-chain hydrocarbons containing 5 to 50 carbon atoms in the straight chain portion of the molecule and from 1 to 20 carbon atoms in a side chain containing said impurities in an inert liquid of low volatility with a hot inert stripping gas at an elevated temperature above 150° F., but below the decomposition temperature of thiourea adducts, under subatmospheric pressure in a stripping zone for a period of time sufficient to volatilize and substantially remove said occluded volatile non-adducted straight chain and cyclic hydrocarbon impurities from said solid adduct, and leaving a solid adduct of thiourea complexed with said branched-chain hydrocarbons.

6. A process according to claim 5 wherein said temperature is in the range of 150° to 325° F. and said pressure is in the range of 1 mm. to 100 mm. Hg.

7. A process according to claim 5 wherein said hot inert stripping gas is selected from the group consisting of steam, combustion gas, normally gaseous hydrocarbons, carbon dioxide, and nitrogen.

References Cited

UNITED STATES PATENTS

| | | | | |
|---|---|---|---|---:|
| 2,520,715 | 8/1950 | Fetterly | | 260—96.5 |
| 2,606,140 | 8/1952 | Arnold et al. | | 260—96.5 |
| 2,719,145 | 9/1955 | Skelton et al. | | 260—96.5 |
| 3,328,313 | 6/1967 | Dellow | | 208—308 |

OTHER REFERENCES

"Crystalline Adducts of Urea," W. J. Zimmerschied et al., pp. 225, 235–237, Sept. 18–23, 1949, Atlantic City, N.J.

Kemp et al., Ind. Eng. Chem. Anal. Ed., vol. 17, pp. 387–89 (1945).

LEON ZITVER, Primary Examiner

M. W. GLYNN, Assistant Examiner

U.S. Cl. X.R.

208—308